United States Patent [19]
Piccinino, Jr. et al.

[11] Patent Number: 6,041,966
[45] Date of Patent: Mar. 28, 2000

[54] ENCLOSURE FOR A BOTTOM DRAINING CONTAINER

[75] Inventors: Ralph L. Piccinino, Jr., Rush; Kevin H. Blakely, Rochester, both of N.Y.

[73] Assignee: Eastman Kodak Company, Rochester, N.Y.

[21] Appl. No.: 09/168,779

[22] Filed: Oct. 8, 1998

[51] Int. Cl.$^7$ ...................................................... G03D 3/06
[52] U.S. Cl. .............................. 222/51; 222/67; 141/96; 396/578; 396/626; 340/619; 340/624; 73/306; 73/319; 73/322.5
[58] Field of Search ................................ 222/51, 64, 67; 137/397, 398; 340/619, 623, 624; 396/578, 626; 73/305–308, 313, 319, 322.5; 141/95, 96, 198

[56] References Cited

U.S. PATENT DOCUMENTS

| | | | |
|---|---|---|---|
| 2,076,454 | 4/1937 | Foxwell | 340/623 |
| 4,014,010 | 3/1977 | Jinotti | 340/619 |
| 4,714,176 | 12/1987 | Wijnen | 222/51 |
| 5,781,821 | 7/1998 | Nakashima et al. | 396/626 |

FOREIGN PATENT DOCUMENTS 0 675 072   10/1995   European Pat. Off. .

*Primary Examiner*—J. Casimer Jacyna
*Attorney, Agent, or Firm*—Frank Pincelli

[57] ABSTRACT

A valve assembly and a bottom-draining container having the valve assembly. The valve assembly comprising a first body member, a guide member supported by the first body member so that the guide member will extend upward into the container, and a float mounted for movement along the guide member, the float being buoyant in a liquid to be drained from the container, the float having a mating surface for engaging a second mating surface on the valve assembly when the float is in the unsensed position, the mating surface of the float having a configuration for minimizing sticking of the float with respect to the valve assembly.

10 Claims, 7 Drawing Sheets

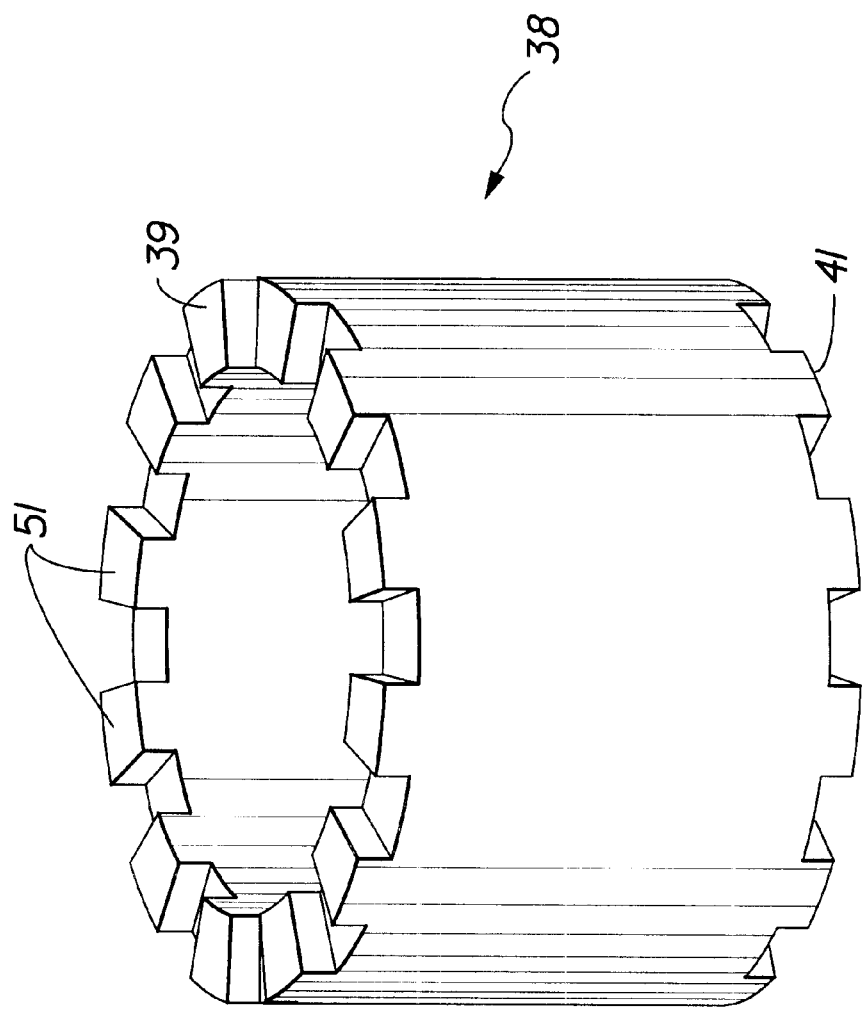

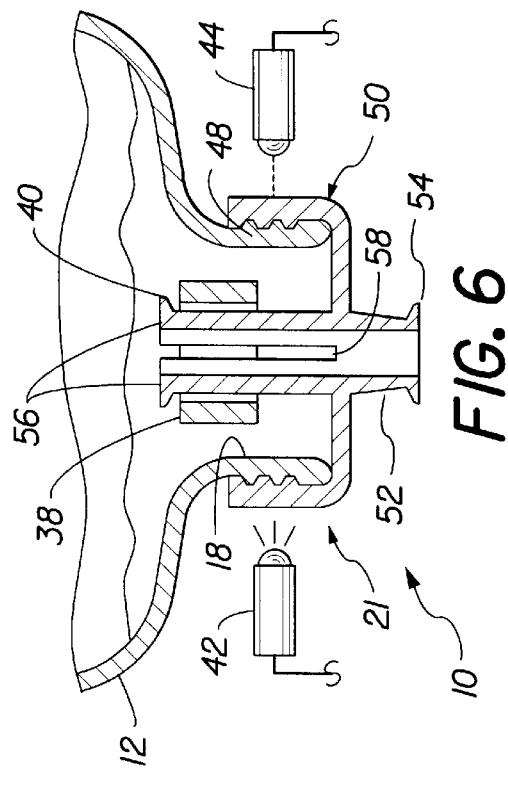
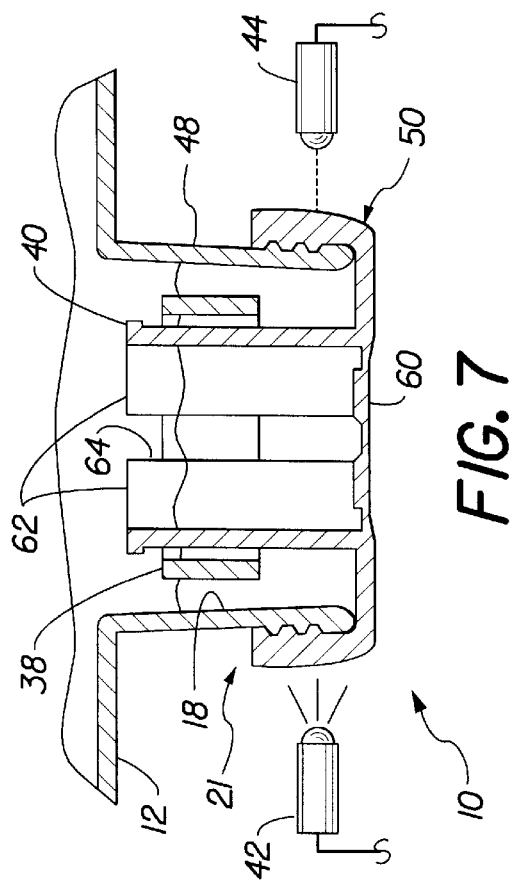

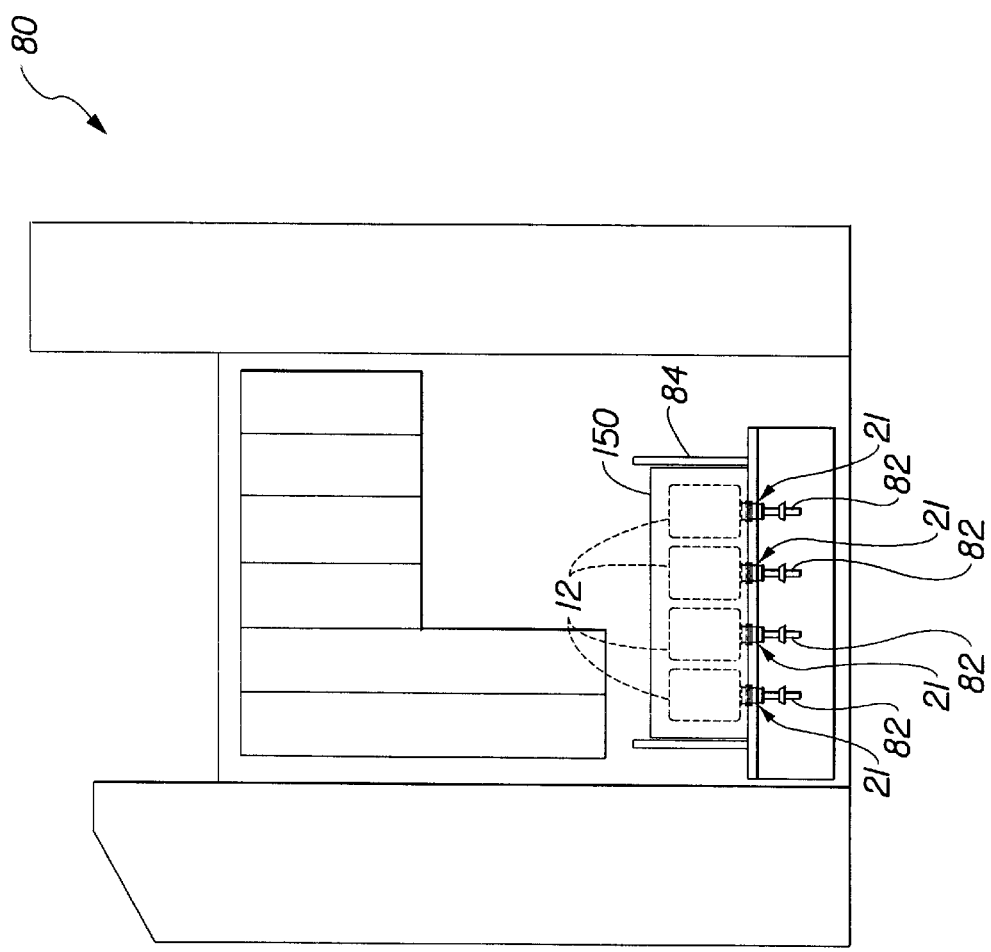

6,041,966

ENCLOSURE FOR A BOTTOM DRAINING CONTAINER

FIELD OF THE INVENTION

The invention relates to containers for dispensing liquids. More in particular, the invention concerns containers with a bottom opening and techniques for detecting a low liquid level in such containers.

BACKGROUND OF THE INVENTION

Commonly assigned, published European Patent Application No. 0 675 072 A1 discloses a valve assemblage useful for dispensing liquids from a collapsible container or a rigid, vented container. At the bottom of the container, a first valve is installed in the spout of the container, the first valve assembly including a moveable, spring-biased piston which normally prevents flow of liquid from the container. An associated apparatus, such as a photographic processor into which the liquid is to be dispensed, includes a second valve assembly having a probe member which engages the piston of the first valve assembly to move the piston to a position which permits flow. As the first valve assembly is opened by the probe member, the second valve assembly also opens, thus establishing a flow path for liquid from the container into the associated apparatus.

As the associated apparatus operates, the liquid drains from the container. It would be desirable to provide a simple means for detecting and signaling a low liquid level within the container to enable an operator of the associated apparatus to replace the container in a timely fashion. Various systems are known for detecting liquid level in a vessel, such as those shown in U.S. Pat. Nos. 4,014,010 and 4,714,176. In copending U.S. patent application Ser. No. 08/671,459 entitled "Apparatus for Detecting Low Liquid in Bottom Draining Container", filed Jun. 27, 1996, there is disclosed a system for detecting low liquid level in a bottom draining container. In this copending application a float is used in combination with a beam of radiation to detect low level in the container in response to the position of the float. While the product works very well, a problem has been found in that occasionally the float may stick in position and thereby prevent proper operation of the detection system. In particular, surface tension between the engaging surface and the stop in combination with the surrounding liquid provides a surface tension such that occasionally the float will stick and cause misreadings.

Applicants have solved the problem of the float sticking by providing an improved float member for use in the valve assembly associated with the container.

SUMMARY OF THE INVENTION

In accordance with one aspect of the present invention there is provided a valve assembly for a bottom-draining container. The valve assembly comprising a first body member, a guide member supported by the first body member so that the guide member will extend upward into the container, and a float mounted for movement along the guide member, the float being buoyant in a liquid to be drained from the container, the float having a mating surface for engaging a second mating surface on the valve assembly when the float is in the unsensed position, the mating surface of the float having a configuration for minimizing sticking of the float with respect to the valve assembly.

In another aspect of the present invention there is provided a bottom draining container, comprising a spout extending from the container, the spout having a central bore through which liquid can drain from the bottom of the container, at least one guide member positioned in the spout, and a float mounted for movement in the spout along the guide member, the float being buoyant in a liquid to be drained from the container, the float having a first mating surface for engaging a stop when the float is in the unsensed position, the engaging surface having a configuration for minimizing sticking of the float with respect to the closure.

In still another aspect of the present invention there is provided a valve assembly for a bottom-draining container. The valve assembly includes a first body member, a guide member supported by the first body member so that the guide member will extend upward into an associated container; and a float mounted for movement along the guide member, the float being buoyant in a liquid to be drained from the container and having an mating surface for mating a second mating surface on the body, the first or second mating surface having a configuration for minimizing sticking of the float.

In yet another aspect of the present invention there is provided a bottom draining container, comprising a spout extending from the container, the spout having a central bore through which liquid can drain from the bottom of the container, a guide member positioned within the spout, and a float mounted from movement in the spout along the guide member, the float being buoyant in a liquid to be drained from the container, the float having an mating surface for engaging a second mating surface when the float is in the unsensed position, the first mating or second mating surface having a configuration for minimizing sticking of the float with respect to the body.

BRIEF DESCRIPTION OF THE DRAWINGS

The following is a detailed description of the preferred embodiments of the invention, reference being made to the drawings in which the same reference numerals identify the same elements of structure in each of the several Figs.

FIG. 5 is an enlarged perspective view of the float of FIG. 4;

FIG. 6 is a further embodiment of the apparatus, valve assembly and container according to the invention, including a drain conduit through the closure;

FIG. 7 is an elevational, center-line sectional view of still another embodiment of the apparatus, valve assembly and container according to the invention, including a frangible portion or a pierceable portion in the closure; and FIG. 8 is a schematic diagram of an apparatus of FIG. 1.

DETAILED DESCRIPTION OF THE INVENTION

Figure 1:
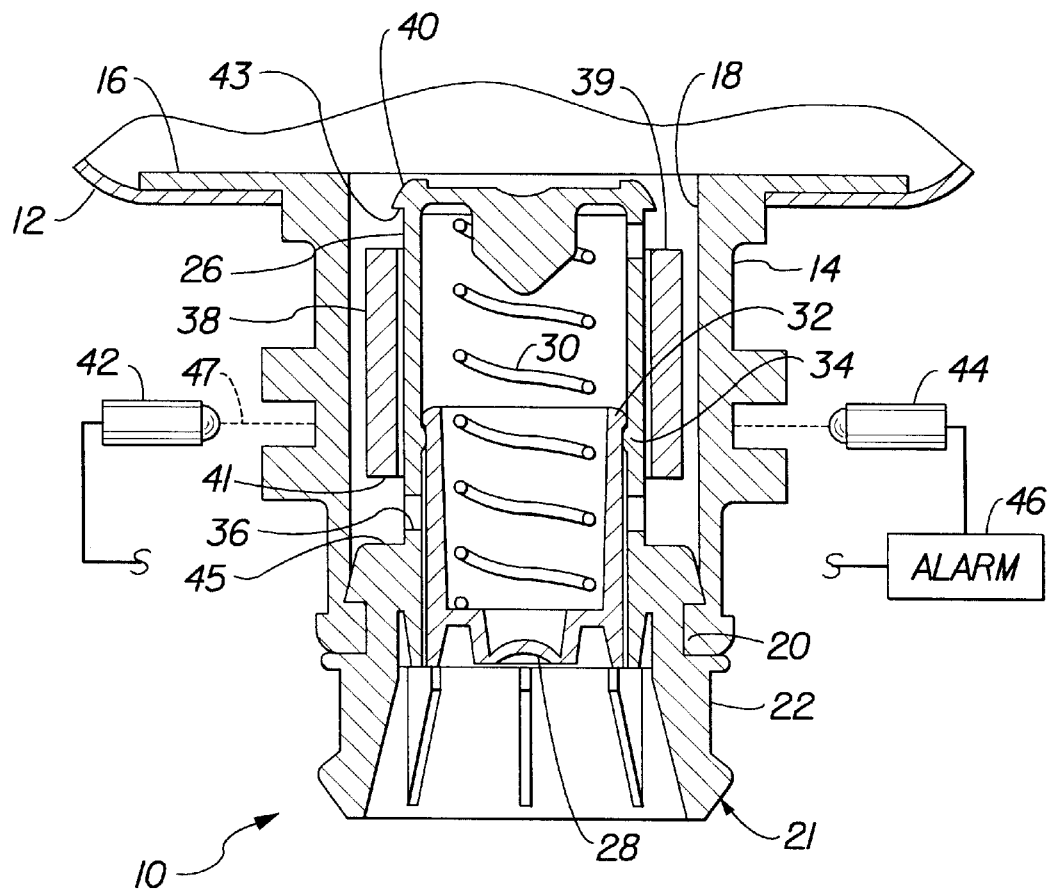
FIG. 1 is an elevational, center-line sectional view of one embodiment of the apparatus, valve assembly and container according to the invention, including a dispensing valve in the spout from the container.
Figure 2:
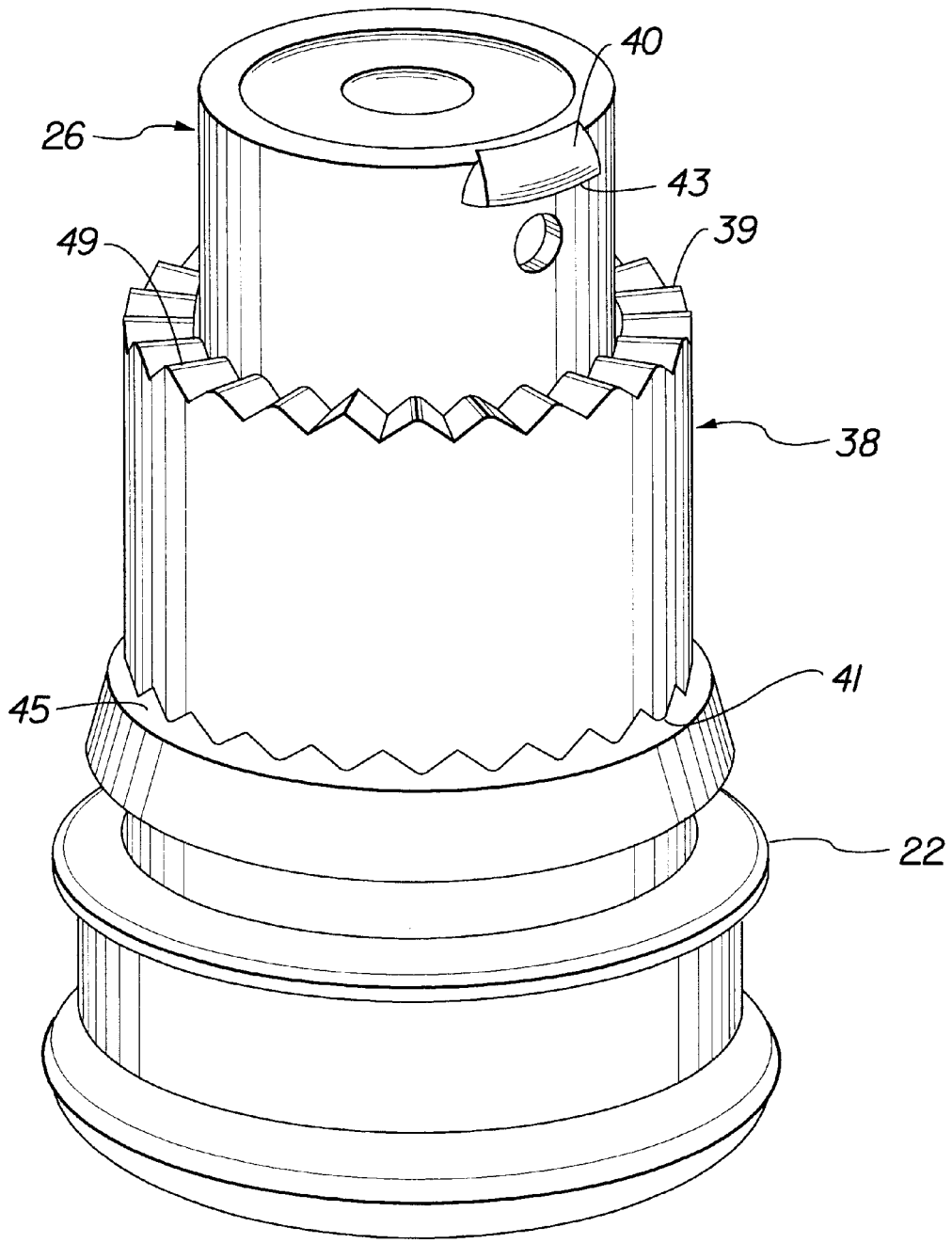
FIG. 2 is a perspective view of the valve assembly of FIG. 1.
Figure 3:
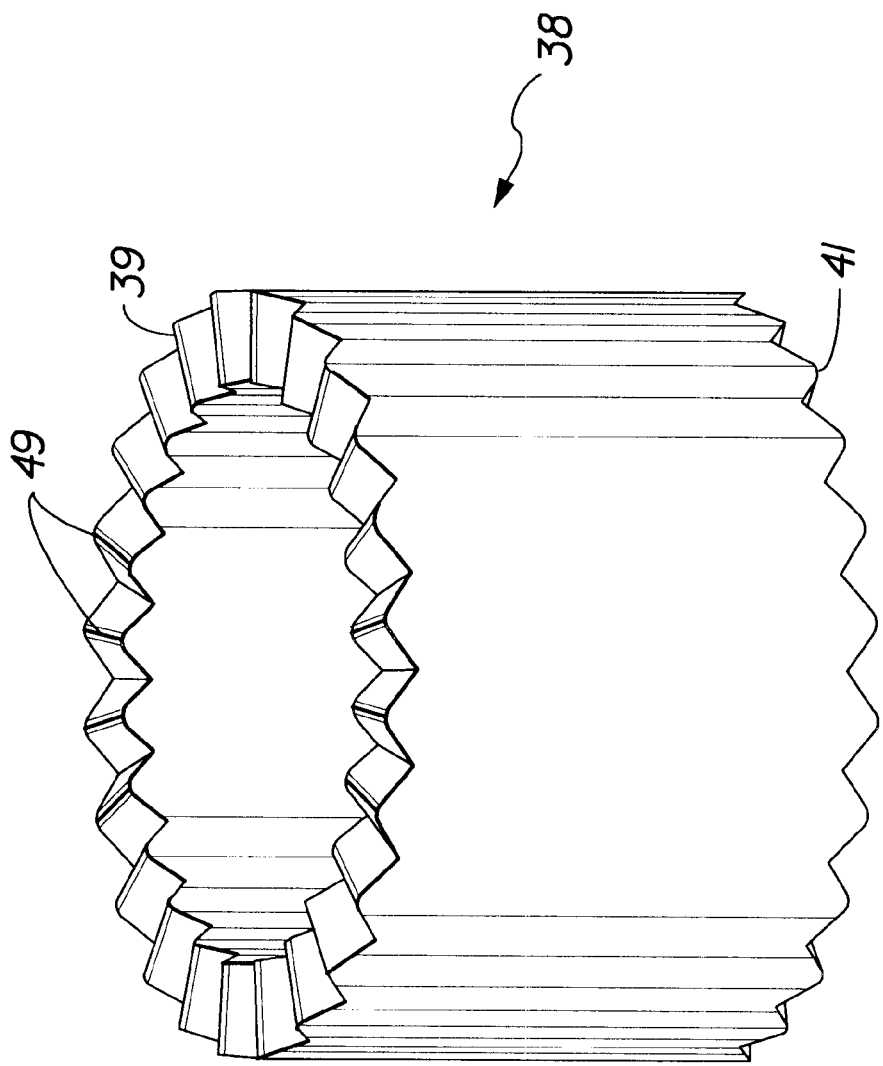
FIG. 3 is an enlarged perspective view of the float of the valve assembly of FIGS. 1 and 2.

Referring to FIGS. 1–3, those skilled in the art will understand a first embodiment of an apparatus 10 for detecting low liquid level in accordance with the invention. A container 12, shown only fragmentarily, may be collapsible or rigid and vented. In a suitable opening through the bottom of container 12, a spout 14 is mounted to extend outwardly of the container. A flange 16 extends radially outward from the spout 14 and is sealed to container 12 in any convenient way, such as by heat sealing. A central bore 18 extends through the spout 14 to facilitate draining of liquid from the container. At a lower end of bore 18, a radially inward and circumferentially extended flange 20 engages a combined valve body 22 of valve assembly 21. A circumferential groove in body 22 tightly receives flange 20 to provide a seal. Extended upwardly from body 22 is an integrally molded valve cylinder 26 within which a hollow valve piston 28 is mounted for sliding movement. A spring 30 is captured between cylinder 26 and piston 28 to bias the piston 28 to the illustrated, closed position where a radially outwardly extended shoulder 32 on the piston engages a radially inwardly extended shoulder 34 on cylinder 26. A plurality of radial ports 36 extend through cylinder 26 near its lower end. In operation of the valve assembly 21 of FIG. 1, the container is lowered onto a mating probe of an associated valve assembly in an apparatus 80 (see FIG. 8). A probe 82 (shown in FIG. 8) engages piston 28 and causes it to move upwardly within cylinder 26 against the force of spring 30. Eventually, ports 36 are opened as the piston moves upwardly, thereby permitting flow of liquid downwardly from container 12 to the associated apparatus.

The invention provides means for detecting when the level of liquid reaches about the middle of spout 14. At least one annular float 38, made to be buoyant in the liquid flowing from the container, is mounted for sliding movement on an exterior surface of cylinder 26, which thus acts as a guide member for the float 38. A radially outwardly extended stop 40 is provided at or near an upper end of cylinder 26 to limit the upward movement of the float 38. Although float 38 moves on a guide member and has the advantage of capturing the float 38 within the spout 14, the float 38 may also comprise one or more spherical bodies placed in the container at the time of filling with liquid. In that instance, the float 38 would simply roll and settle into the spout 14 as the liquid level drops, making the guide member unnecessary, or the float 38 could be confined in the spout 14 by any suitable means which would not interfere with flow of liquid from the spout 14.

Outside of spout 14, typically in the associated apparatus 80, a radiation source 42 is provided which produces a beam of radiation to which the materials of spout 14, cylinder 26 and piston 28 are translucent and to which the material of float 38 is opaque. The beam 47 of radiation is directed across a chord, preferably a diameter, of spout 14 so that the float 38 will intersect the beam 47 as the float 38 falls within the spout when the liquid has drained to that level. Opposite to source 42, a radiation detector 44 is provided. An alarm circuit 46, which may be comprised in a controller for the associated apparatus, is operatively connected to source 42 and detector 44. Those skilled in the art will appreciate that source 42 may be a conventional combined emitter and detector, in which case float 38 would be reflective of the beam and separate detector 44 would be unnecessary, without departing from the scope of the invention. Because the liquid level is detected in spout 14, only a small percentage of the liquid originally in the container will remain when detector 44 is actuated. This is important since many governmental units have issued environmental regulations which require that less than about 3%, typically, of a potentially hazardous liquid remain in the container at the time of disposal.

When the liquid level is above spout 14, float 38 will rise to its maximum height against stop 40. The beam from source 42 will pass through the translucent materials of spout 14, cylinder 26 and piston 28 to detector 44. As the liquid level drops into the spout, the float of opaque material will settle downward, eventually interrupting the beam of radiation and causing detector 44 and alarm circuit 46 to alert the operator of the associated equipment. For a source which produces light having wavelengths in the infrared spectrum, a suitable translucent material is low density polyethylene plastic, and a suitable opaque material is carbon-filled high density polyethylene plastic. Those skilled in the art will appreciate, however, that other materials and radiation spectrums may be selected without departing from the scope of our invention.

As illustrated in FIGS. 1–3, the float 38 has an upper annular engaging surface 39 and a lower engaging annular surface 41. The upper annular mating surface 39 is designed to mate with (a substantially smooth) annular surface 43 of stop 40 and lower annular surface 41 is designed to mate with annular surface 45 of body 22. The annular mating surface 39 and/or 43 is designed so as to minimize surface contact therebetween such that the float 38 will freely move up and down with respect to the body 22.

Figure 4:
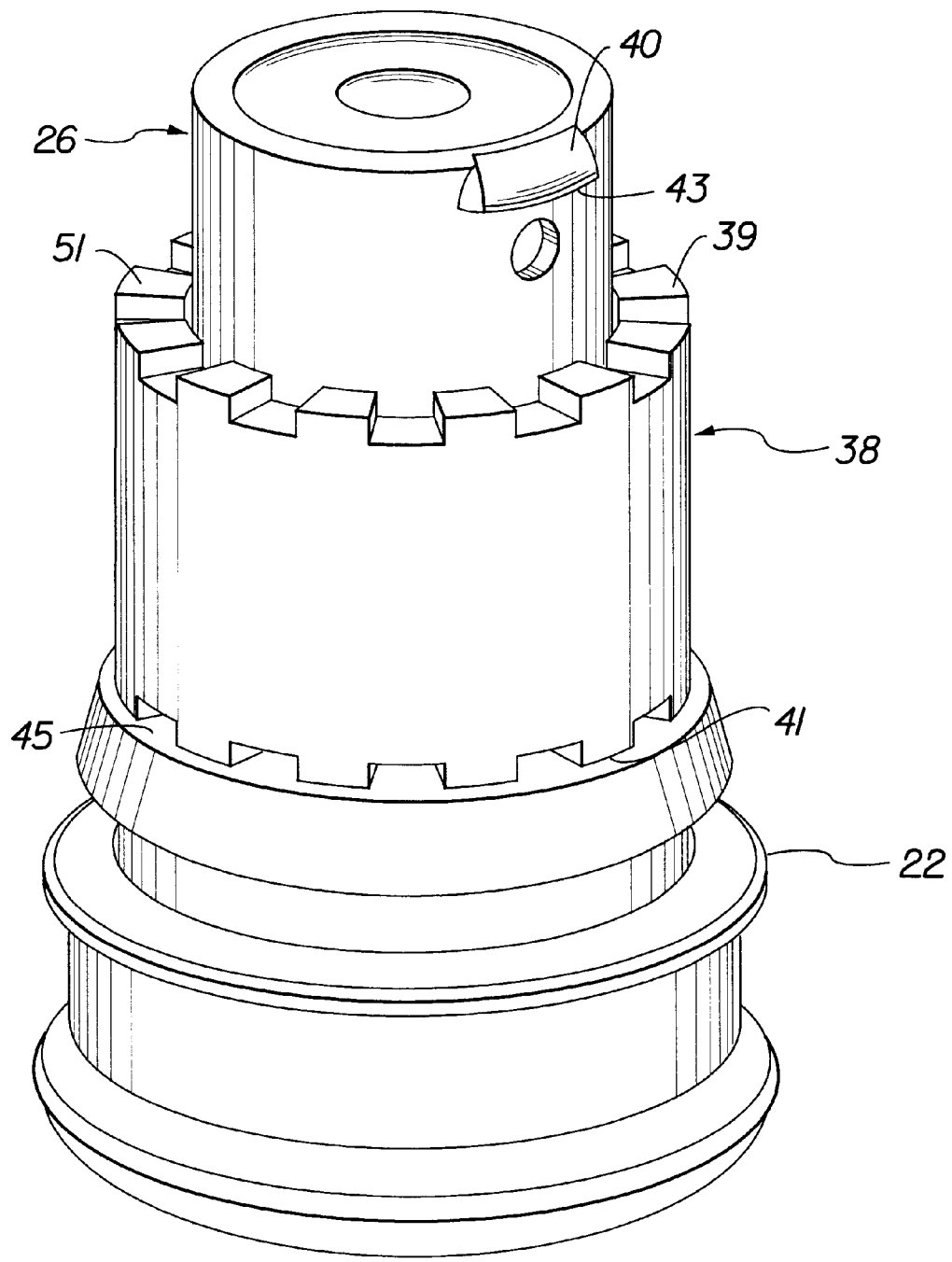
FIG. 4 is a view similar to FIG. 2 illustrating yet another embodiment of a valve assembly made in accordance with the present invention.

Referring to FIG. 3, there is illustrated float 38 by itself greatly enlarged. In the particular embodiment illustrated, annular mating surface 39 has a saw-tooth-type pattern such that a plurality of edges 49 are provided which provide substantial edge contact with the mating surface 43 of stop 40 and surface 45. Preferably, as illustrated in the embodiment of FIG. 2, the float 38 is symmetrical such that the annular mating surface 41 is similarly constructed in the same manner as annular mating surface 39. This helps minimize any potential problem associated with assembly of the valve assembly 21 and possibly improve ease of manufacturing of the float 38. However, if desired, the annular mating surface 41 may take any other shape of configuration and/or even be smooth if so desired. It is also to be understood that instead of modifying surface 39, mating surface 43 may be modified to provide edge contact so that the float will not stick thereto. It is only necessary that one of mating surfaces 39,43 be constructed such that a minimal amount of surface area is provided so as to prevent sticking between the two surfaces. It is easier and more economical to provide the edge contact on float 38. It is to be understood the annular mating surfaces 39, 41, 43 and 45 may take a variety of other shapes and configurations in the scope of the present invention. FIGS. 4 and 5 illustrate a modified float 38 made in accordance with the present invention. In this embodiment, surfaces 39 and 41 have a generally rectangular saw-tooth configuration. The flat sections 51 are small enough that sticking of the float will not occur.

As illustrated in FIG. 1, the source 42 of radiation and detector 44 are positioned such that they are closely adjacent to the mating surface 45. In such cases it is important that the shape of the annular mating surface 41 be such that a sufficient area of float 38 is provided to provide the appropriate signal to acknowledge when the float 38 is in the closed position as illustrated in FIG. 1. The annular mating surface is designed so a sufficient amount of area of the teeth of surface 41 is presented for either reflecting or stopping the beam of radiation so as to provide the appropriate signal. In this regard, the size, pattern and/or shape of teeth of the saw-tooth configuration of surface 41 are designed such that the beam of radiation being emitted from source 42 will either be reflected off the side of the float closed to the source, or on the other side of the float directly across the source 42 and thereby prevent the beam from passing through both sides of the float 38 when the float 38 is in the sensed position.

It is to be understood that valve assembly 21 may be provided in various other type configurations such as illustrated in FIGS. 6 and 7. In particular FIG. 6 shows a second embodiment of the valve assembly 21, and container 12 includes an integral spout or neck 48, which accepts a screw-on closure 50 in the familiar manner. A central drain conduit 52 extends from closure 50 and includes a conventional hose fitting 54 for attachment to a delivery hose, not shown, in the associated apparatus. Extended upwardly from closure 50 around an entrance to conduit 52 are a plurality of guide members 56 which may be molded integrally with the closure. The guide members are separated by slots 58, only one of which is visible in the section view of FIG. 6. Float 38 is mounted around the guide members and its upward movement is limited by radial stops 40 at or near upper ends of the guide members. The second embodiment operates in the same manner as the first.

FIG. 7 shows a third embodiment of the invention. Rather than drain conduit 52, closure 50 includes a central frangible portion 60 which can be broken by a sharp probe or cannula in the associated apparatus, in the familiar manner. Rather than a frangible portion, a pierceable septum may be use. Extended upwardly from closure 50 around portion 60 are a plurality of guide members 62 which may be molded integrally with the closure. The guide members are separated by slots 64, only one of which is visible in the section view of FIG. 3. The third embodiment operates in the same manner as the first and second.

Referring to FIG. 8, there is illustrated a photographic apparatus 80 for developing of an exposed undeveloped photosensitive material, for example, film and/or paper. In a particular embodiment illustrated, photographic apparatus 80 comprises a minilab, however, the present invention is not limited to such. The apparatus 80 includes a plurality of probes 82, each designed to mate with an associated valve assembly 21. In the embodiment illustrated, four probes 82 are provided, however, any desired or required number may be provided. An appropriate mechanism 84 is provided for holding of a cassette 150 containing a plurality of containers 12, such as illustrated FIG. 8, in the inverted position such that when the cassette 150 is lowered, the valve assemblies 21 of each container 12 in cassette 150 will engage an associated probe 42 provided on apparatus 80. The cassette 150 may be manually lowered or may be lowered through the use of a powered mechanical system, not shown.

When the valve assemblies 21 and probes 82 are urged toward each other in a mating relationship, an open fluid flow path is formed allowing liquid to flow from container 12 to apparatus 80.

To disengage valve assemblies 21 from probes 82, they are urged away from each other to stop flow therebetween.

The present invention provides an improved closure while the float moves freely between the unsensed and sensed positions and thus avoids the problem of the float sticking. In addition, the present invention is designed such that the float is of appropriate shape and weight so that it is sensed by the radiation such that an appropriate signal may be provided for indicating of low level liquid in the container.

It is to be understood that various other changes and modifications may be made without departing from the scope of the present invention, the present invention being defined by the following claims.

PARTS LIST

10 Apparatus
12 Container
14 Spout
16 Flange
18 Central bore
20 Flange
21 Assembly
22 Valve body
26 Valve cylinder
28 Valve piston
30 Spring
32 Outwardly extended shoulder
34 Inwardly extended shoulder
36 Ports
38 Annular float
39 Upper annular surface
40 Stop
41 Lower annular mating surface
42 Radiation source
43 Annular surface
44 Radiation detector
45 Annular surface
46 Alarm circuit
47 Beam
48 Spout or neck
49 Edges
50 Closure
51 Flat section
52 Conduit
54 Hose fitting
56 Guide members
58 Slots
60 Frangible portion
62 Guide members
64 Slots
80 Photographic apparatus
82 Probe
84 Mechanism
150 Cassette

What is claimed is:

1. A valve assembly for a bottom-draining container, comprising:

a first body member;

a guide member supported by the first body member so that the guide member will extend upward into the bottom-draining container; and at least one float mounted for movement along the guide member, the float being buoyant in a liquid to be drained from the bottom-draining container said float having an mating surface for engaging a second mating surface when the float is in the unsensed position, the mating surface of said float having a configuration in the circumferential direction of varying height for minimizing sticking of the float with respect to the valve assembly.

2. The valve assembly according to claim 1 when the first mating surface has a saw-tooth configuration.

3. A valve assembly according to claim 1 when the float has a second mating surface designed to contact a second mating surface on the body when liquid has fallen below a predetermined level.

4. A valve assembly according to claim 3 wherein said first and second mating surfaces are symmetrical in configuration.

5. A bottom draining container, comprising:

a spout extending from the container, the spout having a central bore through which liquid can drain from the bottom of the container;

a guide member positioned within the spout; and a float mounted from movement in the spout along the guide member, the float being buoyant in a liquid to be drained from the container and having a first mating surface for engaging a stop when the float is in the unsensed position, the engaging surface having a configuration in the circumferential direction of varying height for minimizing sticking of the float with respect to the spout.

6. A valve assembly for a bottom-draining container, comprising:

a first body member;

a guide member supported by the first body member so that the guide member will extend upward into the bottom-draining container; and a float mounted for movement along the guide member, the float being buoyant in a liquid to be drained from the bottom-draining container, said float having an mating surface for mating a second mating surface on said body, the first or second mating surface having a configuration in the circumferential direction of varying height for minimizing sticking of the float.

7. The valve assembly according to claim 6 wherein the first or second mating surface has a saw-tooth configuration.

8. A valve assembly according to claim 6 wherein the float has a third mating surface designed to contact a forth mating surface on the body when liquid has fallen below a predetermined level.

9. A valve assembly according to claim 8 wherein said first and third mating surfaces of said float are symmetrical in configuration.

10. A bottom draining container, comprising:

a spout extending from the container, the spout having a central bore through which liquid can drain from the bottom of the container;

at least one guide member positioned within the spout; and at least one float mounted from movement in the spout along the guide member, the float being buoyant in a liquid to be drained from the container, said float having an mating surface for engaging a second mating surface when the float is in the unsensed position, the first mating or second mating surface having a configuration in the circumferential direction of varying height for minimizing sticking of the float with respect to the body.

* * * * *